United States Patent
King et al.

(10) Patent No.: US 9,031,901 B1
(45) Date of Patent: May 12, 2015

(54) FLEXIBLE DATABASE SCHEMA

(75) Inventors: Craig Robert King, Friendswood, TX (US); Richard K. Freeman, Sugar Land, TX (US)

(73) Assignee: Symantec Corporation, Mountain View, CA (US)

( * ) Notice: Subject to any disclaimer, the term of this patent is extended or adjusted under 35 U.S.C. 154(b) by 297 days.

(21) Appl. No.: 13/252,163

(22) Filed: Oct. 3, 2011

Related U.S. Application Data (60) Provisional application No. 61/484,670, filed on May 10, 2011.

(51) Int. Cl.
G06F 7/00 (2006.01)
G06F 17/00 (2006.01)
G06F 12/08 (2006.01)

(52) U.S. Cl.
CPC .................................. *G06F 12/0802* (2013.01)

(58) Field of Classification Search
None
See application file for complete search history.

(56) References Cited

U.S. PATENT DOCUMENTS 8,825,716 B2 * 9/2014 Martin et al. ................. 707/811
2004/0133551 A1 * 7/2004 Linstedt ........................... 707/1
2010/0332456 A1 * 12/2010 Prahlad et al. ............... 707/664
2011/0295795 A1 * 12/2011 Venkatasubramanian et al. ............................. 707/602
2012/0054147 A1 * 3/2012 Goetz et al. .................. 707/602
2012/0265726 A1 * 10/2012 Padmanabhan et al. ...... 707/602

OTHER PUBLICATIONS

Ballard, Chuck et al., "Data Warehousing with the Informix Dynamic Server," IBM, International Technical Support Organization, Redbooks, Dec. 2009, pp. 1-478.

* cited by examiner

*Primary Examiner* — Rehana Perveen
*Assistant Examiner* — Raheem Hoffler
(74) *Attorney, Agent, or Firm* — Campbell Stephenson LLP

(57) ABSTRACT

Various systems and methods can provide a flexible database schema. One method can store information identifying a first entity in a first table. A unified data model includes several tables, including the first table and a metadata table. Each of the tables stores information describing one or more entities belonging to a respective archetype. The first table already stores information identifying a second entity when the information identifying the first entity is stored. The second entity is already related to another entity when the information identifying the first entity is stored. The first entity is a new type of entity not already stored in the first table when the information identifying the first entity is stored. The method then stores metadata associated with the first entity in a metadata table. The metadata then identifies the new type of entity.

22 Claims, 6 Drawing Sheets

FLEXIBLE DATABASE SCHEMA

RELATED APPLICATIONS

This application claims the domestic benefit under Title 35 of the United States Code §119(e) of U.S. Provisional Patent Application Ser. No. 61/484,670, entitled "Flexible Database Schema," filed May 10, 2011, and naming Richard K. Freeman and Craig Robert King as the inventors, which is hereby incorporated by reference in its entirety and for all purposes as if completely and fully set forth herein.

FIELD OF THE INVENTION

This invention relates generally to computing and, more specifically, to computing tasks involving database schema.

DESCRIPTION OF THE RELATED ART

The database schemas used by many business information (BI) and key performance indicator (KPI) systems are built with explicit structures to express the relationships and definitions of entities and metrics within the system. While such explicit structures allow database performance to be optimized for the exact data model currently used by the BI system, the structures do not allow any variations to the data model. Accordingly, if the data model needs to be updated (e.g., to include a new type of data), the explicit data structures will have to be extensively modified. After these structural changes are made to the data model, support systems that both import information into the model and retrieve data from the model for presentation must also be modified to work with the new data model presented by the database schema. Thus, changes introduced to a traditional BI data model require modifications to both the data model's structure and all of the components that interface to the data model.

As an example, data warehouse models typically require three key elements: a structure to store the data, a process to feed data into the system (e.g., an extract, transform, load (ETL) process), and finally a system that presents the data to consumers. If a model tracks two entities A and B, which are related on a specific key value, then the traditional BI system would include: tables or a cube with A and B represented structurally with their relationship, an ETL process to populate data into the structure, and some sort of presentation (such as a report) that displays the data to a user. If a new entity C is introduced into the model, or if a change in the relationship between and/or definition of entities A or B is introduced, then all three aspects of the BI system would have to change. In particular, the BI system would need a new table to represent C and/or a new table structure for A or B, a modified ETL process that can correctly insert data into the new and/or modified tables, and modified queries that retrieve the data for presentation to the user. As a result of these across-the-board change requirements, the cost of extending or even modifying BI systems is quite prohibitive. Typically, these costs result in long project timelines and resource demands or a reduction in planned product enhancements. Thus, the hardwired nature of this design can negatively impact the timing of getting a product to market and/or the product's overall competiveness in the market.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
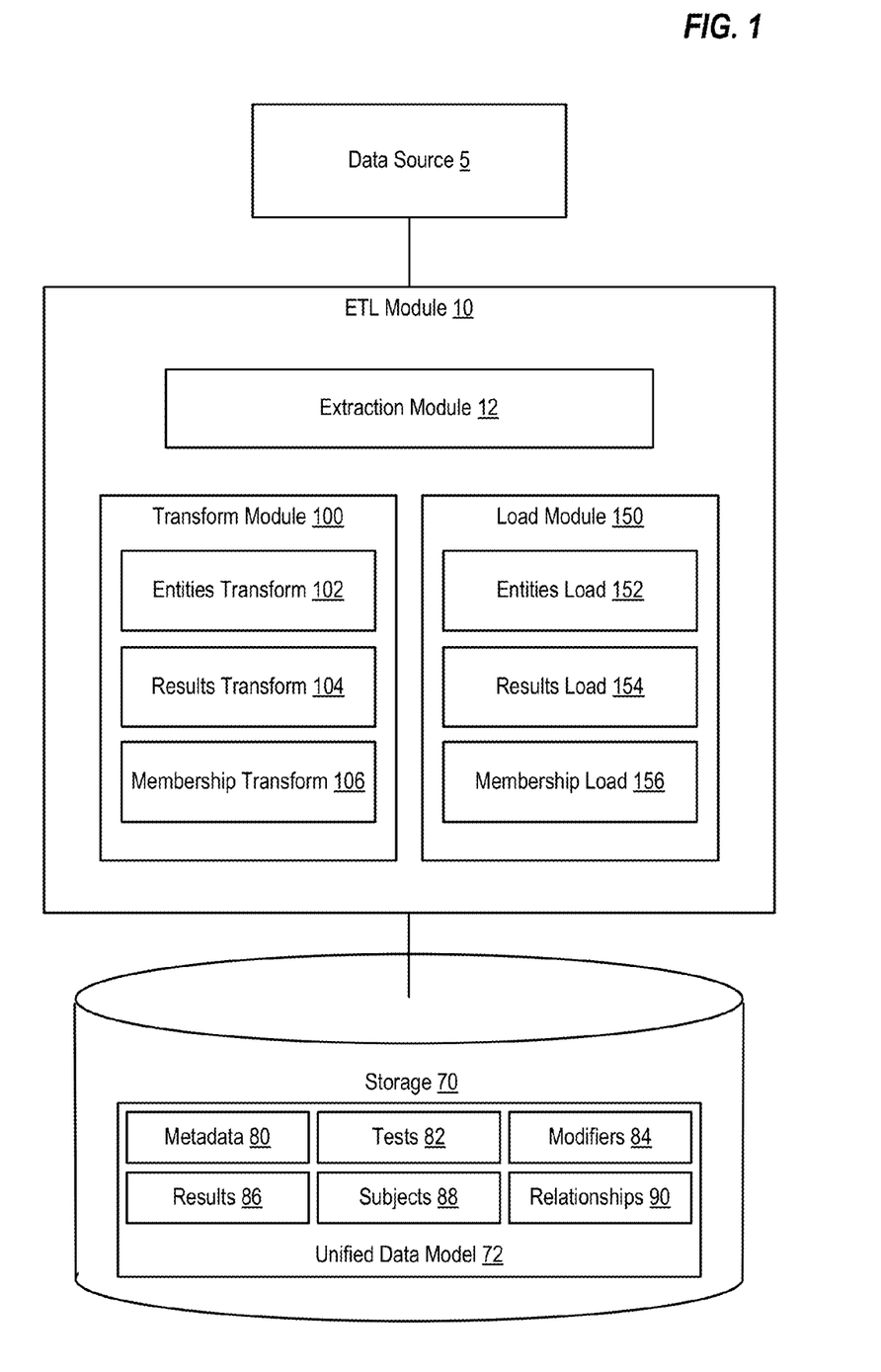
FIG. 1 is a block diagram of a system that provides a flexible database schema, according to one embodiment of the present invention.

FIG. 1 is a block diagram of a system that provides a flexible database schema. As shown, the system includes a data source 5, an extract, transform, load (ETL) module 10, and a storage device 70 that stores a unified data model (UDM) 72. The UDM 72 stores data used by a business information (BI) or other system. For example, UDM 72 can store reporting data used to determine whether an organization is in compliance with a set of regulations. UDM 72 can store data used to perform compliance management, risk management, policy management, threat management, entitlement management, and the like.

Data source 5 can be any source of data to be included in UDM 72. For example, data source 5 can be another database or set of multiple such databases (which may or may not be related to each other). It is noted that data source 5 can be distributed among a variety of computing devices and/or networks. Additionally, some systems may include multiple different data sources, each of which can be a different type of data source.

Figure 2:
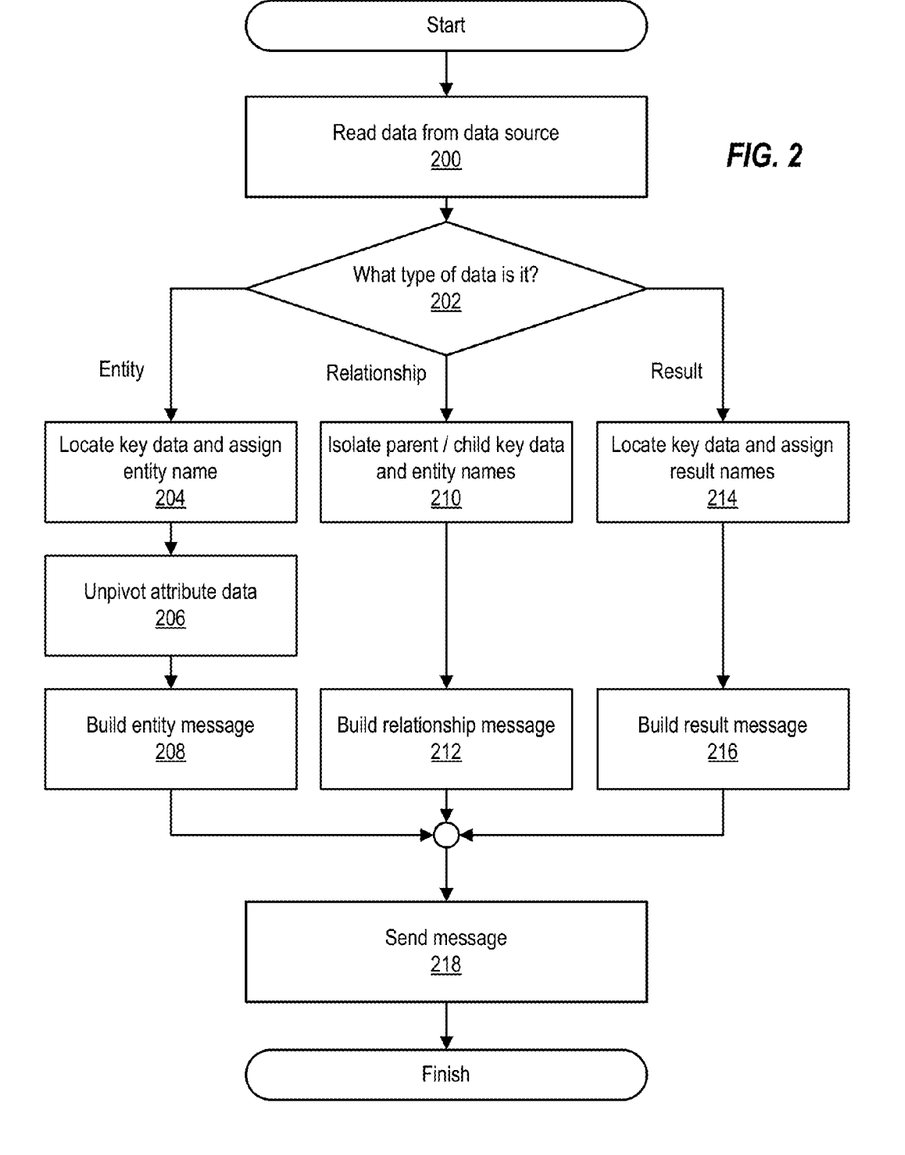
FIG. 2 is a flowchart of a method of transforming data for input to a flexible database schema, according to one embodiment of the present invention.
Figure 3:
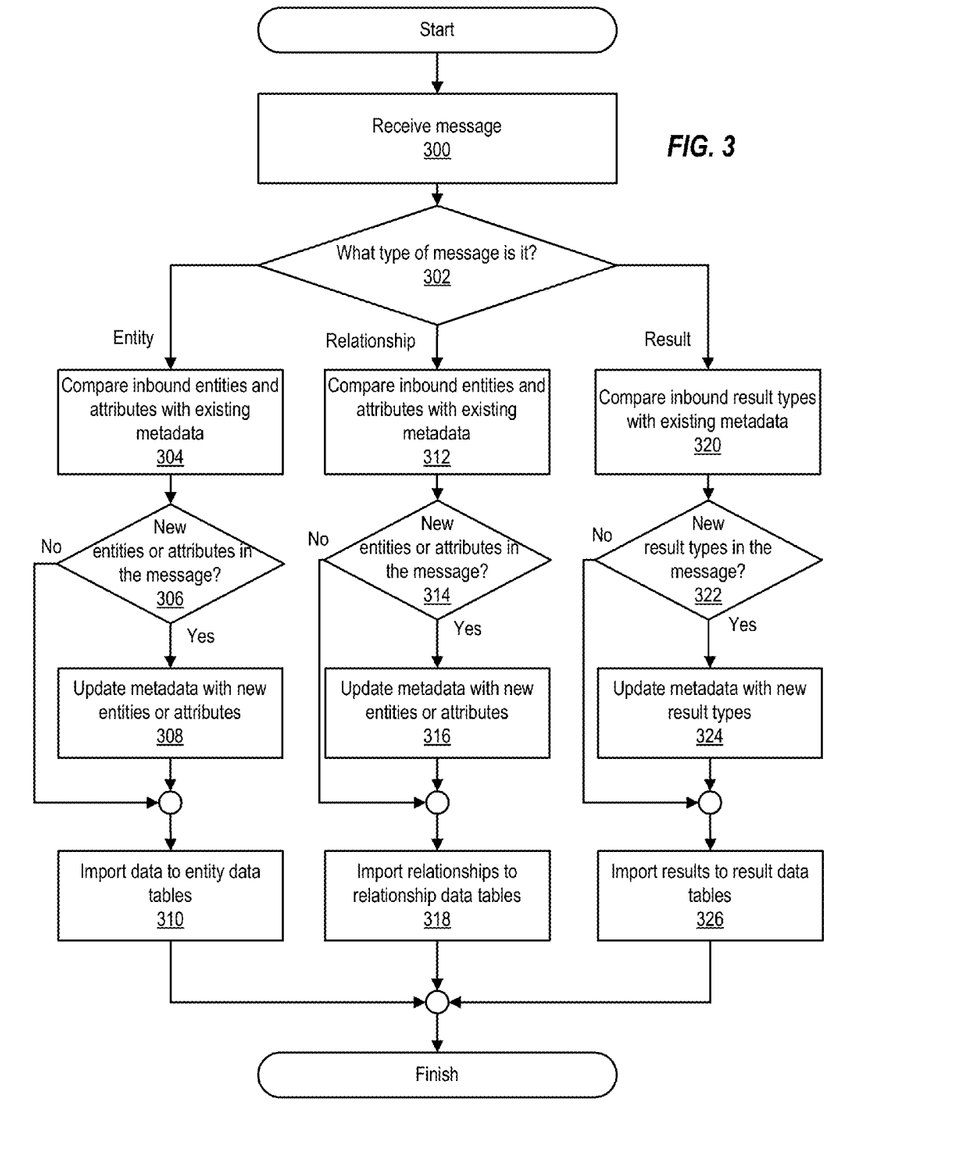
FIG. 3 is a flowchart of a method of loading data into a flexible database schema, according to one embodiment of the present invention.

As shown in FIG. 1, ETL module 10 includes an extraction module 12, a transform module 100, and a load module 150. Transform module 100 can include modules to transform specific archetypal types of data from a data source into appropriate representations within UDM 72: entities transform 102, results transform 104, and relationships transform 106, as described in more detail below. Similarly, load module 150 includes specific modules to handle specific archetypal types of data: entities load 152, results load 154, and relationships load 156. In some embodiments, transform module 100 can operate as shown in FIG. 2, and load module 150 can operate as shown in FIG. 3.

In this example, the archetypes (e.g., basic types of data) operated on are entities, results, and relationships. Entities are objects that define the items being transported into UDM 72. Within UDM 72, an entity can be defined in a 'type' table which defines the structure where the entity's data belongs. In this example, the types of entities include subjects, tests, and modifiers.

UDM 72 includes several different tables, each of which stores different types of data. Each table within UDM 72 can be implemented as a key-value pair (KVP) table. Accordingly, each table can include one or more rows corresponding to a given object, where each row stores a key, which is a value that identifies the object, as well as one or more values associated with that object. Such values can include information referencing another row in another table, information indicating a relationship between the object and another object, information describing the object, and the like.

The tables can include a metadata table 80 (e.g., storing information such as attributes associated with the different types of entities), tests table 82 (e.g., storing data identifying one or more tests, which are a type of entity), modifiers table 84 (e.g., storing data identifying one or more modifiers, which are a type of relationship), results table 86 (e.g., storing data identifying one or more results, which fall into the result archetype), subjects table 88 (e.g., storing data identifying one or more subjects, which are another type of entity), and relationships table 90 (e.g., storing data identifying hierarchical relationships between entities). Tests table 82 stores data describing one or more tests, which are yet another type of entity. In some embodiments, other tables are included in addition to and/or instead of those shown here. Additionally, more than one table of a particular type (e.g., multiple relationships tables) can be implemented. An example of a specific schema that can be used to implement these and other tables within UDM 72 is provided in FIG. 4.

Subjects identified in subjects table 88 are entities that can be operated on by tests. A subject is typically a material entity, such as an asset (e.g., an item of licenses software, a fire extinguisher, a computing device, or the like), which is maintained and tracked though its lifecycle within an organization. Subjects can also be business processes, people (e.g., users or employees), documents, or any other thing that can be evaluated against a test. In a compliance system, subjects can include information technology (IT) assets and business entities against which various tests might be applied for the purpose of assessing an enterprise compliance level or risk posture.

Figure 4:
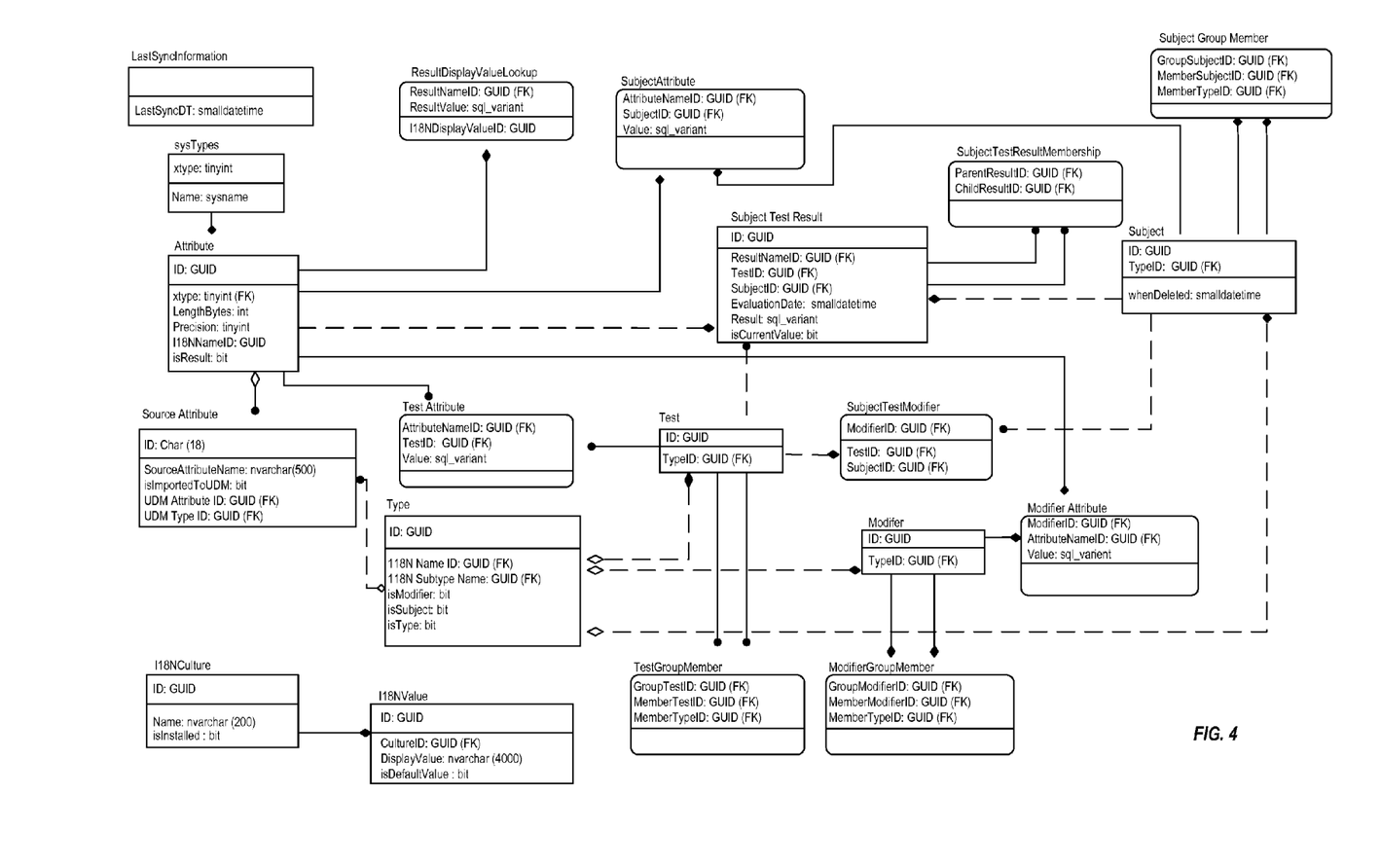
FIG. 4 is an example of a flexible database schema, according to one embodiment of the present invention.

An entity, such as a subject identified within subjects table 88, is composed of attributes, which can be imported into an 'attribute' tables (e.g., as shown in FIG. 4) within UDM 72. An entity could be a table, or an instance of a class within a schema, in the data source.

Each attribute can be standardized and stored in an attribute table as metadata defining the attribute itself. For example, a Windows™ NT machine owned by an organization could be stored as a 'subject' of type 'asset' with an attribute in a SubjectAttribute table (e.g., as shown in FIG. 4) identifying it as a Windows™ NT machine. Asset attributes can be standardized to narrow the list of possible attributes (e.g., to remove redundancy). For example, instead of maintaining different attributes for identifiers, names (e.g., for employees), host names (e.g., for computing devices), and the like, all of these attributes can be standardized as the simple attribute "name".

In one embodiment, entities are imported from the data source into the UDM system of FIG. 1 in an eXtensible Markup Language (XML) document (e.g., generated by transform module 100 of ETL module 10) of the following form:

```
<Entities>
<Entity      Type="type"      Subtype="subtype"
    [Processing={normal|custom|permissions}]>
    <Key KeyValue="key value"/>
    <Attribute Name="attrib name" Value="value"
        [DataType="sql      type"      Size="number"
            Precision="number"]/>
    . . .
</Entity>
. . .
</Entities>
```

The <type> & <subtype> attributes refer to the natural type of the data flowing into the system from the data source, such as 'Policy' or 'Asset'. Subtype refers to another level of categorization, such as 'Asset->Windows NT Machine' or 'Asset->AssetGroup.' The <Processing> attribute is used to indicate the ETL process to use to process the entity by indicating whether the entity is a normal entity, a custom entity or a set of permissions. The <key value> attribute indicates the natural key value(s) to join into the subject, test, or modifier related to this entity. The <Attribute> attribute indicates information that needs to be placed into the metadata tables to define the entity, if the entity is not of a type that already exists within the UDM. If the entity is a type of entity that already exists, the XML document will use the common attribute(s) already available for that type of entity and no metadata information will be needed for those common attributes.

A test identified within tests table 82 is simply an evaluation that can be applied to a subject. For example, in a compliance system, a test can be used to verify compliance with a set of policies, standards, and/or mandates. Policies, mandates, standards, and other high level documents, which in turn can contain a multitude of individual tests, can also be considered tests; however, the results of the tests are aggregated across the collection of tests within the high-level document's scope.

Tests can include compliance evaluation or risk assessment instruments such as mandates, policies, standards, questionnaires, objectives, scenarios, and the like. Tests may include and/or be associated with specific lower-level verification logic that can be technical and/or procedural in nature. Subjects and tests are related through modifiers, which are stored in modifiers table 84, and results as described below.

Modifiers table 84 stores data describing one or more modifiers. Modifiers are references to one or more other objects. These references can modify the relationships between subjects and tests, and thus affect the results that arise from applying tests to subjects. For example, exceptions are considered a modifier, since exceptions alter the relationships between subjects, tests and their corresponding results (e.g., if a subject falls within an exception, the subject may no longer be subject to a test, or a result of applying that test to that subject may change value (e.g., from fail to pass or vice versa)). Since consumers need to select whether to apply such modifiers to subjects and/or results in order to support various testing activity, modifiers are separated from the overall subject-test-results relationships by being stored in a separate table.

Modifiers can provide a global reference to system or process constraints that can modify the application or outcome of a test. A given modifier can apply to both test and subject elements or simply to a subject or test by itself. An example would be exceptions that can modify the test results by excluding specific subjects or tests from an assessment operation.

In some embodiments, results are stored in a distinctive structure (results table 86) within UDM 72 which may require special treatment for import compared to normal entity data (e.g., as shown in FIG. 2). In one embodiment, as shown in FIG. 4, result types are defined by the attribute table and typed by the is Result bit. For example, 'checkresults' would establish the type of the result; however, since the highest level of the typing is that the data is a result, the result category is instead stored as an attribute to support result typing and result definition from the attribute table in the UDM.

Results table 86 stores data identifying one or more results. Results can represent the outcome of a test evaluated upon a subject, a collection of tests on a single subject, a test on a collection of subjects, and the like. Aggregated results, typically known as 'scores,' can exist in reference to a test or a subject without a relationship to the other.

Results provide a metric or an aggregation of metrics derived from the application of Tests against a Subject or group of Subjects. For example, assets typically carry an overall 'compliance score' which is simply the aggregation of all tests executed upon the asset regardless of the tests' membership within specific policies and standards. The same is true for overall scores related to a given policy or other high level compliance measurement document where the subjects involved are completely aggregated.

Results can be stored in a single table (results table 86) within UDM 72. Results are related to the subjects and tests involved in the result. For aggregated scores, described above, the subject or test key is optional such that rollup scores on either side will be stored in this structure and not as attributes specific to the item. In embodiments that store these scores in a single result table, all results and scores will be stored in one place, which can provide clarity to UDM consumers and providers as to where this data can be found and where it belongs.

Result table 86 can also enable the pairings of subjects and test results. Additionally, result table 86 can store results of tests that were not applied against specific subject(s). An example would be an answer (result) to a question (test) that was not associated with an asset (subject). Results can be generated after data has been imported to the UDM. For example, a test identified in a tests table can be applied to an entity identified in an entity table to generate a result that can be stored in the result table.

In one embodiment, results are imported from the data source into the UDM system of FIG. 1 in an XML document (e.g., generated by transform module 100 of ETL module 10) of the following form:

<Results>
  <Result Type="type" EvaluationDate="evaluation date and time"
    <Subject
      <Key KeyValue="key value"/>
    </Subject>
    <Test
      <Key KeyValue="key value"/>
    </Test>
    <ResultValue Value="result value"/>
  </Result>
  ...
</Results>

Here, the <type> attribute refers to the natural type of the data flowing into the UDM, such as 'Evidence Value' or 'Compliance Score.' The <evaluation date and time> attribute indicates when the evaluation result was generated. The <key value> attributes indicate the natural key values to join into the subject or test to which this result applies. The <resultvalue> attribute indicates the result value for this evaluation score Relationship entities are 'containers' holding several members, such as a container that defines a level with a hierarchy. These types of entities can be composed of both attributes and relationship information. This relationship structure is specially designed to carry this relationship into the import process but it will only contain one child level at a time, this way the entire hierarchy can be represented simply by communicating all the parent objects.

When a hierarchical relationship is extracted from a data source, the ETL module 10 can query one level down to find the children of the particular entity described by the relationship.

In one embodiment, results are imported from the data source into the UDM system of FIG. 1 in an XML document (e.g., generated by transform module 100 of ETL module 10) of the following form:

<Relationship>
  <Parent Type="type">
  <Key KeyValue="key value" Subtype="subtype"/>
  <Child Type="type">
    <Key KeyValue="key value"/>
  </Child>
  ...
  </Parent>
  ...
</Relationship>

The <key value> attributes indicate the natural key values to join into the subject or test to which this key represents either the parent or child objects.

Data such as permissions (not shown in FIG. 1) can be handled with a combination of entity and relationship categories, however their typing is hard coded to indicate they have special processing rules such that the import process will place the data into the specialize permissions tables.

Metadata can include information such as information defining the attributes of different types of entities, as described above. The metadata table can provide information usable as a directory to the UDM by identifying the various entities (e.g., in the Type table below) within the UDM. In one embodiment (e.g., that uses the schema shown in FIG. 4), the metadata includes information such as the following, which can be stored in several different tables (identified in the first column):

| LastSync-Information | | Globally stores the last time data was updated within the UDM. |
|---|---|---|
| | LastSyncDT | Last date and time data was updated in the UDM. This is global in scope to be used by dashboards to fire refresh events. |
| Source-Attribute | | This table joins the inbound XML streams with the metadata stored in the UDM to provide mapping from the XML streams for transformation. |
| | ID | PK, GUID, internally generated |
| | Source-AttributeName | The name of the attribute from the inbound XML stream for entities. Thus this is an external FK to the XML stream on 'attributename'. |
| | isImported-toUDM | Indicates if this attribute is supposed to be imported to the UDM. If false then, don't import this attribute. If this is false for all the attributes within a given entitytype, then do not process the input. |

| | | |
|---|---|---|
| LastSync-Information | | Globally stores the last time data was updated within the UDM. |
| | UDMAttributeID | FK, GUID, to Attribute table, joins the source attribute to its relative, standardized, attribute in the UDM. SQL processing will join on this key to retrieve the standard name of the attribute. |
| | UDMTypeID | FK, GUID, Type table, indicates the UDM section where this attribute belongs. A majority of the date within an XML stream will be assigned to a single type, however, sometimes certain attributes belong somewhere else. This is especially true for assets, where most attributes are typed as subject, but there are also several scores, which are typed as result. |
| Attribute | | This table identifies all attributes within the UDM. This table is separated from the Type table (defined below) which identifies the entities in the UDM so that Attributes can be standardized and reused across all entities within the UDM. |
| | ID | PK, GUID, internally generated |
| | xtype | FK, smallint, to the systypes SQL Server table; this identifies the sql datatype for the attribute since all the data is stored as SQL_Variant. |
| | I18NNameID | CK, FK, GUID, to the Il8NValue Lookup table. This is the name of the Attribute and must be unique within the UDM model. |
| | isResult | indicates that this is the name of a type of result found in the SubjectTestResult table. |
| Type | | This table identifies all entities within the UDM and the entity's membership within the different UDM structures; Test, Subject, and Modifier. Results are not typed since they cannot possess attributes. The boolean (bit) columns are exclusive and therefore one and only one of the three columns can be set to true. |
| | ID | PK, GUID, internally generated |
| | I18NNameID | CK, FK, GUID, to the Il8NValue Lookup table. This is the name of the Type which must be unique within the UDM model. EXERNAL FK, via the default lookup value, to XML stream attribute 'type' in entity and relationship. |
| | I18NSubType-NameID | CK, FK, GUID, to the I18NValueLookup table. This is a subtype name |
| | isModifier | indicates that this type is stored in the Modifier section of the UDM. |
| | isSubject | indicates that this type is stored in the Subject section of the UDM. |
| | isTest | indicates that this type is stored in the Test section of the UDM. |
| Result-Display-Value-Lookup | | Not all results are numeric as there are results which came back as literals, such as 'true' or 'false'. This table resolves these values for localization purposes such that the literals, 'true' and 'false' can be translated within the 118N structures in the UDM. |
| | ResultNameID | PK, FK, GUID, to Attribute table where isResult is true. This identifies the result itself. |
| LastSync-Information | | Globally stores the last time data was updated within the UDM. |
| | ResultValue | PK, sql_variant; this is the raw literal value from the SubjectTestResult table. Technically, the literal value found in the SubjectTestResult table is a FK to this field. |
| | I18NDisplay-Value | FK, GUID, to the Il8NValue lookup table for localized value lookup. |

ETL module 10 is configured to import data from one or more data sources such as data source 5 and load that data into UDM 72. ETL module 10 can extract the attributes for each entity, relationship, result (if any), and/or test from the data source and place them into their corresponding destination tables within UDM 72, as described in more detail below. In some embodiments, each time a new version of an entity, relationship, or result, is created (e.g., due to new data being placed into UDM 72 and/or existing data within UDM 72 being modified), that new object can be saved with a version date (e.g., identifying the time of creation) or version number, such that changes to objects can be tracked through their lifecycle.

ETL module 10 includes an extraction module 12, which is configured to extract information from a data source. Extraction module 12 can be configured to access a variety of different types of data sources.

ETL module 10 also includes a transform module 100 and a load module 150. Transform module 100 is configured to transform data extracted by extraction module 12 into a format that can be stored within the UDM 72. This transformed data can then be loaded (e.g., written) into UDM 72 by load module 150.

Transform module 100 includes specific modules to handle different archetypal data, such as entities transform module 102, which handles various types of data that fall within the entities archetype; results transform module 104, which handles various types of data that fall within the results archetype; and relationship transform module 106, which handles various types of data that fall within the relationship archetype. Similarly, load module 150 includes entities load module 152, which handles various types of data that fall within the entities archetype; results load module 154, which handles various types of data that fall within the results archetype; and relationship load module 156, which handles various types of data that fall within the relationship archetype. Other archetype-specific modules may also be included if it is desirable to transform and/or load other types of archetypes.

Results transform module 104 within ETL module 10 can aggregate test scores if an aggregated score is not available from the source, but is required to be consumed. Accordingly, aggregated test scores may not be required to be computed at report generation time or any other time at which data is to be extracted by extraction module 12.

UDM 72 can maintain information (e.g., in a relationship table) describing the relationship between a set of tests (e.g., standards, policies, mandates, statements, and questionnaires) to previously scoped subjects (e.g., assets, business entities, and users). The intersection of these subjects and tests intersect is a set of results (e.g., pass/fail, compliance score, or the like).

In some embodiments, each of the subject, test, and modifier tables can employ an "item" relationship structure, as shown in FIG. 4. The Item relationship will store the header information for a given entity such as name, GUID, role, and type as an 'Item' in an Item table, which will relate to the ItemAttribute table. The ItemAttribute table will dynamically store the attributes associated with the 'Item'. The ItemGroupRelationship table will store any relevant hierarchical relationships involving the 'Item.' This construct will permit the storage of any entity with any varying set of attributes, even amongst like items.

UDM 72 may also include (not shown) a permissions table to store one or more permissions. For example, permission-related tables can store an optimized version of the directory permissions to allow fast filtering of tests or subjects. This set of data may not include any related permissions or roles that could be used by an asset permission report or user management (if not, that data can be part of the regular unified data model structure).

UDM 72 may also include display lookup information (not shown). Lookup-based values can be stored in these tables to be consumed to display data in a localized way. These lookups can be used as supporting tables to the outbound data support to be used along with the domain-based views. For example, a status of a check may be a Boolean of true, false or undefined. To an English consumer ("EN") it can be joined to display "Pass", "Fail", or "Unknown".

UDM 72 thus provides a logical model to encapsulate archetypal data elements such as subjects, tests, modifiers, and results, that are similar in nature. UDM 72 enables data to be imported from various sources and unified into a single model, regardless of whether that specific type of data has already been included in the model (so long as the new data fits within one of the archetypes). Another process (not shown) can access UDM 72 to present all or part of the data stored within UDM 72 to users in the form of business domain views (e.g., to support compliance management, risk management, policy management, threat management, entitlement management, and the like). In turn, the generation and display of reports can be derived from these business domain views. UDM 72 is considered unified inasmuch as data from each module or external source is stored in the same structure, thus providing an abstract data model whose structure is independent of the disparate nature of the data sources feeding into the unified structure.

UDM 72's structure allows for the dynamic nature of the source data. Data coming into reporting can be from either data known at development time or from third party data only known after the UDM's release is in the field. By using a unified model, any type of data can be represented in the database without a structural change to the schema. Similarly, new types of data can be imported into the UDM without requiring changes in ETL module 10.

FIG. 2 is a flowchart of a method of transforming data for input to a flexible database schema. This method can be performed by an ETL module such as ETL module 10 of FIG. 1.

The method involves reading data from the data source, as shown at 200. This operation can be performed by an extraction module such as extraction module 12 of FIG. 1. The first operation in the ETL process can involve identifying data to import into the UDM and the source(s) of that data and accessing that data. This data can be stored in an external database that is accessed by the extraction module.

The data from the data source can then be grouped into basic archetypal categories that correspond to structures for storing each of those archetypes within the flexible database schema. In this embodiment, those categories are: results, relationship, and entities, as shown at 202. The data can be categorized into these main categories based on structural cues, by brute force, or by any other available technique. This determination can be made by a transform module such as transform module 100 of FIG. 1.

Once a determination as to the type of data has been made, the transform module (e.g., transform module 100 of FIG. 1) can then transform the information into an appropriate XML message. Some data can contain multiple values and nested data structures. This data can be 'flattened' into a single entity/attribute perspective before being imported. Depending on the type of data, a different type of message can be generated (e.g., as shown above in the description of FIG. 1). These different messages can each be implemented as respective XML documents.

If the data is an entity, an entity transform module (e.g., entities transform module 102 of FIG. 1) locates the key data for that entity and assigns an entity name to the entity, as indicated at 204. The entity transform module can then unpivot (e.g., remove the formatting, such as organization into a row or column, for) the attribute data, as indicated at 206. The entity transform module can then build an entity XML message that includes the key data, entity name, and attribute data, as indicated at 208.

If the data is a relationship, a relationship transform module (e.g., relationship transform module 106 of FIG. 1) can isolate the parent and/or children key data and entity names, as shown at 210, and then build a relationship XML message that includes the isolated key data and entity names, as indicated at 212.

If the data is a result, a result transform module (e.g., result transform module 104 of FIG. 1) can locate the key data for the result and assign a result name, as indicated at 214. The result transform module can then build a result XML message that includes the key data and result name, as indicated at 216.

The transform module can then send the constructed XML message, of appropriate type, generated at 208, 212, or 214 to a load module, as indicated at 218.

Each XML message can store information about the attributes of the object described by the XML message. For example, an entity XML message can include information about the attributes of the entity. If the entity is of a type that is not already represented within the target database, the new attributes corresponding to the new entity can be explicitly specified within the XML message. If the entity is of a known type, information indicating common attributes (e.g., attributes already defined within a metadata table of the target database) can be included within the XML message.

FIG. 3 is a flowchart of a method of loading data into a flexible database schema. This method can be performed by a load module such as load module 150 of FIG. 1.

The method begins at 300, when an XML message is received from a transform module. The load module can then examine the contents and/or format of the message to determine the type of message (entity, relationship, or result), as indicated at 302.

If the message is an entity message, the load module can compare the entity (or entities) and attribute(s) in the message to existing metadata within the UDM, as indicated at 304 (e.g., to determine if the attributes are common attributes already present in the UDM). If any of the entities or attributes in the message are new with respect to the UDM (i.e., no entities and/or attributes of the same type are currently represented within the UDM), the load module can update the metadata in the UDM to identify the new entities and/or attributes, as indicated at 306 and 308. The load module can then import the data from the message into the entity table (and attribute table, if appropriate), as indicated at 310.

If the message is a relationship message, the load module can compare the entity (or entities) and attribute(s) in the message to existing metadata within the UDM, as indicated at 312 (e.g., to determine if the attributes are common attributes already present in the UDM). If any of the entities or attributes in the message are new with respect to the UDM (i.e., no entities and/or attributes of the same type are currently represented within the UDM), the load module can update the metadata in the UDM to identify the new entities and/or attributes, as indicated at 314 and 316. The load module can then import the data from the message into the relationship table, as indicated at 318.

If the message is a result message, the load module can compare the result in the message to existing metadata within the UDM, as indicated at 320. If any of the results in the message are new with respect to the UDM (i.e., no results of the same type are currently represented within the UDM), the load module can update the metadata in the UDM to identify the new type(s) of results, as indicated at 322 and 324. The load module can then import the data from the message into the result table, as indicated at 326.

Figure 5:
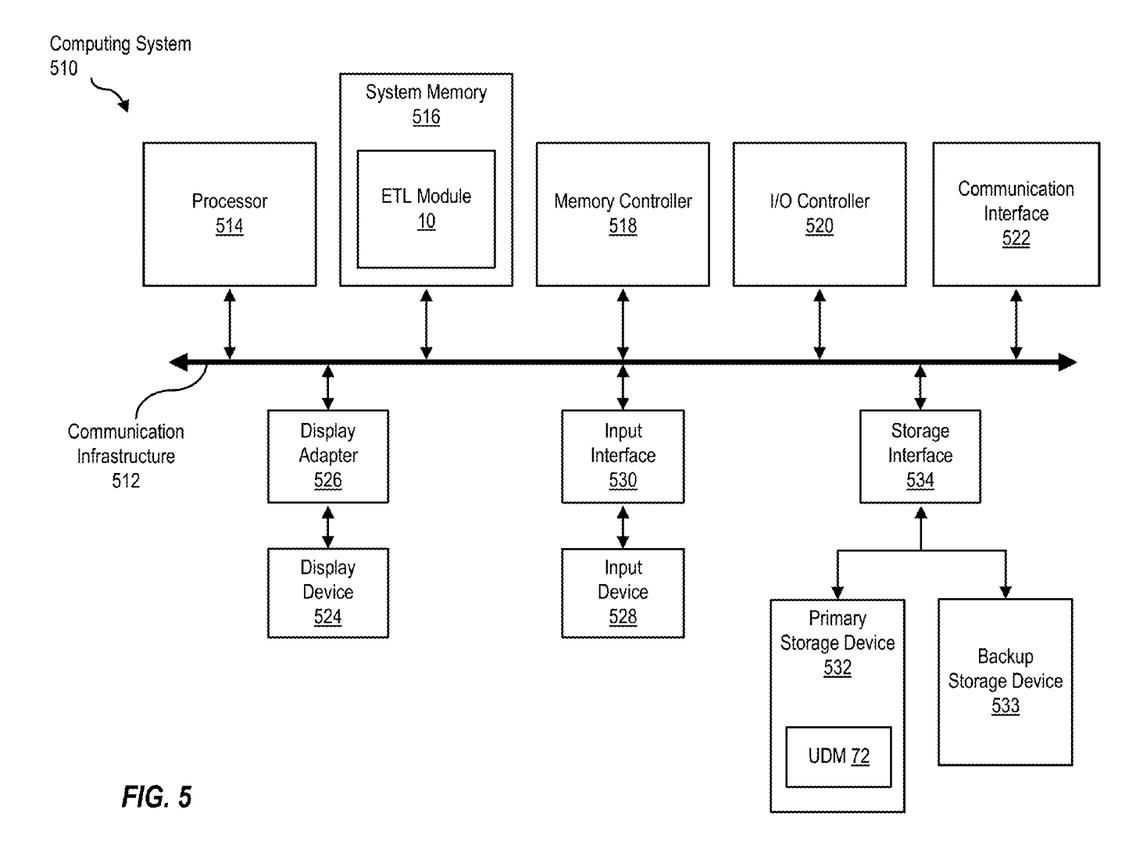
FIG. 5 is a block diagram of a computing device, illustrating how an extract, transform, load (ETL) module for inputting data into a flexible database schema can be implemented in software, according to one embodiment of the present invention.

FIG. 5 is a block diagram of a computing system 510 capable of implementing a flexible database schema as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements an ETL module 10, computing system 510 becomes a special purpose computing device that is configured to load data into a UDM.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, program instructions executable to implement an ETL module 10 (e.g., as shown in FIG. 1) may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such as a UDM 72.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
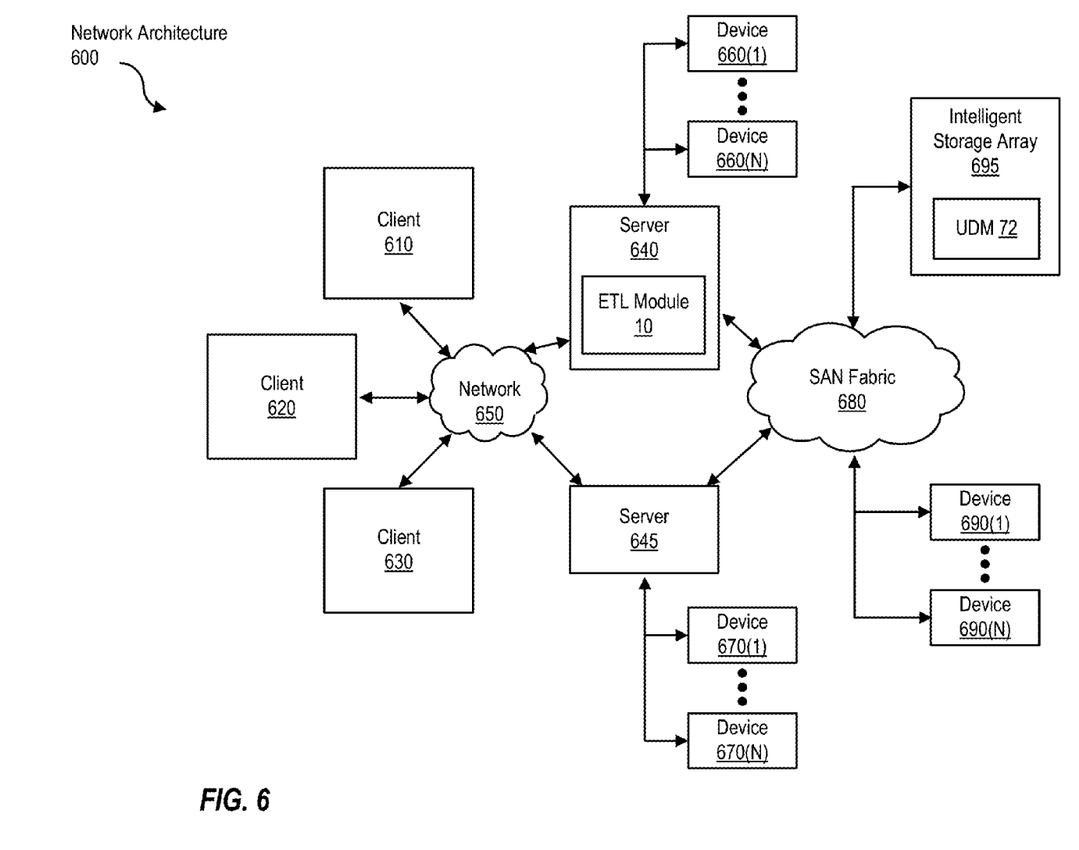
FIG. 6 is a block diagram of a networked system, illustrating how various computing devices can communicate via a network, according to one embodiment of the present invention.

FIG. 6 is a block diagram of a network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of servers 640 and 645 or client systems 610, 620, and/or 630 may include an ETL module 10 as shown in FIG. 1.

As illustrated in FIG. 6, one or more storage devices 640(1)-(N) may be directly attached to server 640. Similarly, one or more storage devices 670(1)-(N) may be directly attached to server 645. Storage devices 640(1)-(N) and storage devices 670(1)-(N) generally represent any type or form of storage device or medium capable of storing data and/or other computer-readable instructions. In certain embodiments, storage devices 640(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store a UDM, as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 640(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 322 in FIG. 6, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 640

(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, an ETL module may transform data received from a data source into a format supported by a UDM.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a first entity of a plurality of entities from a data source of a plurality of disparate data sources, wherein
the first entity comprises a plurality of attributes, and
the plurality of attributes comprise information to define the first entity;
storing information identifying the first entity in a first table of a plurality of tables, wherein
each of the plurality of tables stores information describing one or more entities belonging to a respective archetype of a plurality of archetypes of entities,
the first table already stores information identifying a second entity when the storing the information identifying the first entity is performed,
the second entity is already related to another entity when the storing the information identifying the first entity is performed, and
the first entity is a new type of entity not already stored in the first table when the storing the information identifying the first entity is performed; and
storing metadata associated with the first entity in a metadata table, wherein
the metadata identifies the new type of entity,
the metadata table comprises existing attributes associated with the plurality of archetypes of entities,
the plurality of attributes associated with the first entity are placed into the metadata table to define the new type of entity, and
the storing the information and the storing the metadata are performed by a computing device implementing an interface to a unified data model, wherein
the storing the information is performed regardless of whether the unified data model already comprises the information,
the unified data model comprises the plurality of tables and the metadata table, and
the unified data model provides an abstract data model whose structure is independent of the disparate nature of the plurality of disparate data sources.

2. The method of claim 1, wherein a relationship table of the plurality of tables stores information identifying the relationship between the second entity and the other entity.

3. The method of claim 2, wherein the first table is a subject table, wherein the other entity is stored in the first table, and wherein the relationship indicates a hierarchical relationship between the second entity and the other entity.

4. The method of claim 1, further comprising:
applying a test to the first entity to generate a result, wherein the test is stored in a test table of the plurality of tables; and
storing the result in a result table of the plurality of tables.

5. The method of claim 1, further comprising storing the information in response to receiving an eXtensible Markup Language (XML) message comprising the information and the metadata.

6. The method of claim 5, further comprising:
accessing native information identifying the first entity in a first database;
identifying that the first entity belongs to a first archetype of the plurality of archetypes, wherein the first table of the unified data model stores information identifying entities belonging to the first archetype;
detecting that the first entity belongs to a new type of entity not already represented within the first table;
transforming the native information into the information and the metadata, based upon the identifying and the detecting; and
generating the XML message containing the information and the metadata.

7. The method of claim 1, wherein each of the plurality of tables is a key-value pair (KVP) table, and wherein the metadata table provides information usable as a directory to the unified data model.

8. The method of claim 1, comprising
reading data from the data source of the plurality of disparate data sources, and
determining whether the data is the first entity of the plurality of entities, a relationship, or a result.

9. A system comprising:
one or more processors; and
a memory storing program instructions executable by the one or more processors to implement an extract transform load (ETL) module, wherein the ETL module is configured to:
receive a first entity from a plurality of entities from a data source of a plurality of disparate data sources, wherein
the first entity comprises a plurality of attributes, and
the plurality of attributes comprise information to define the first entity;
store information identifying the first entity in a first table of a plurality of tables, wherein
each of the plurality of tables stores information describing one or more entities belonging to a respective archetype of a plurality of archetypes of entities, the first table already stores information identifying a
second entity when the information identifying the
first entity is stored,
the second entity is already related to another entity
when the information identifying the first entity is
stored, and
the first entity is a new type of entity not already stored
in the first table when the information identifying the
first entity is stored; and
store metadata associated with the first entity in a metadata
table, wherein
the metadata identifies the new type of entity,
the metadata table comprises existing attributes associated with the plurality of archetypes of entities,
the plurality of attributes associated with the first entity
are placed into the metadata table to define the new
type of entity, and
the storing the information and the storing the metadata
are performed by a computing device implementing
an interface to a unified data model, wherein
the storing the information is performed regardless of
whether the unified data model already comprises
the information,
the unified data model comprises the plurality of
tables and the metadata table, and
the unified data model provides an abstract data
model whose structure is independent of the disparate nature of the plurality of disparate data
sources.

10. The system of claim 9, wherein a relationship table of the plurality of tables stores information identifying the relationship between the second entity and the other entity.

11. The system of claim 10, wherein the first table is a subject table, wherein the other entity is stored in the first table, and wherein the relationship indicates a hierarchical relationship between the second entity and the other entity.

12. The system of claim 9, wherein the ETL module is further configured to:
apply a test to the first entity to generate a result, wherein the test is stored in a test table of the plurality of tables; and
store the result in a result table of the plurality of tables.

13. The system of claim 9, wherein the ETL module is configured to store the information in response to receiving an eXtensible Markup Language (XML) message comprising the information and the metadata.

14. The system of claim 13, wherein the ETL module is further configured to:
access native information identifying the first entity in a first database;
identify that the first entity belongs to a first archetype of the plurality of archetypes, wherein the first table of the unified data model stores information identifying entities belonging to the first archetype;
detect that the first entity belongs to a new type of entity not already represented within the first table;
transform the native information into the information and the metadata, based upon the identifying and the detecting; and
generate the XML message containing the information and the metadata.

15. The system of claim 9, wherein each of the plurality of tables is a key-value pair (KVP) table, and wherein the metadata table provides information usable as a directory to the unified data model.

16. A computer readable storage medium storing program instructions executable by one or more processors to implement an extract transform load (ETL) module, wherein the ETL module is configured to:
receive a first entity of a plurality of entities from a data source of a plurality of disparate data sources, wherein
each data source of the plurality of disparate data sources is associated with a respective data type of a plurality of disparate data types,
the first entity comprises a plurality of attributes, and
the plurality of attributes comprise information to define the first entity;
store information identifying the first entity in a first table of a plurality of tables, wherein
each of the plurality of tables stores information describing one or more entities belonging to a respective archetype of a plurality of archetypes of entities,
the first table already stores information identifying a second entity when the information identifying the first entity is stored,
the second entity is already related to another entity when the information identifying the first entity is stored, and
the first entity is a new type of entity not already stored in the first table when the information identifying the first entity is stored; and
store metadata associated with the first entity in a metadata table, wherein
the metadata identifies the new type of entity,
the metadata table comprises existing attributes associated with the plurality of archetypes of entities,
the plurality of attributes associated with the first entity are placed into the metadata table to define the new type of entity, and
the storing the information and the storing the metadata are performed by a computing device implementing an interface to a unified data model, wherein
the storing the information is performed regardless of whether the unified data model already comprises the information,
the unified data model comprises the plurality of tables and the metadata table, and
the unified data model provides an abstract data model whose structure is independent of the disparate nature of the plurality of disparate data sources.

17. The computer readable storage medium of claim 16, wherein a relationship table of the plurality of tables stores information identifying the relationship between the second entity and the other entity.

18. The computer readable storage medium of claim 17, wherein the first table is a subject table, wherein the other entity is stored in the first table, and wherein the relationship indicates a hierarchical relationship between the second entity and the other entity.

19. The computer readable storage medium of claim 16, wherein the ETL module is further configured to:
apply a test to the first entity to generate a result, wherein the test is stored in a test table of the plurality of tables; and
store the result in a result table of the plurality of tables.

20. The computer readable storage medium of claim 18, wherein the ETL module is configured to store the information in response to receiving an eXtensible Markup Language (XML) message comprising the information and the metadata.

21. The computer readable storage medium of claim 20, wherein the ETL module is further configured to:
- access native information identifying the first entity in a first database;
- identify that the first entity belongs to a first archetype of the plurality of archetypes, wherein the first table of the unified data model stores information identifying entities belonging to the first archetype;
- detect that the first entity belongs to a new type of entity not already represented within the first table;
- transform the native information into the information and the metadata, based upon the identifying and the detecting; and
- generate the XML message containing the information and the metadata.

22. The computer readable storage medium of claim 16, wherein each of the plurality of tables is a key-value pair (KVP) table, and wherein the metadata table provides information usable as a directory to the unified data model.

* * * * *